US008456578B2

(12) United States Patent
Tada

(10) Patent No.: US 8,456,578 B2
(45) Date of Patent: Jun. 4, 2013

(54) IMAGE PROCESSING APPARATUS AND CONTROL METHOD THEREOF FOR CORRECTING IMAGE SIGNAL GRADATION USING A GRADATION CORRECTION CURVE

(75) Inventor: Masaru Tada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 13/095,040

(22) Filed: Apr. 27, 2011

(65) Prior Publication Data

US 2011/0267542 A1 Nov. 3, 2011

(30) Foreign Application Priority Data

Apr. 30, 2010 (JP) .................. 2010-104895
Feb. 14, 2011 (JP) .................. 2011-028816

(51) Int. Cl.
*H04N 5/14* (2006.01)
*H04N 5/66* (2006.01)
(52) U.S. Cl.
USPC .......................................... 348/672; 348/383
(58) Field of Classification Search
USPC ................ 348/383, 588, 564, 565, 672, 607,
348/625, 254, 606, 241, 671, 674, 678, 687;
382/274, 260, 264, 266, 268; 345/589, 611;
725/39, 40, 43, 44
See application file for complete search history.

(56) References Cited

U.S. PATENT DOCUMENTS

| 6,289,136 B1 * | 9/2001 | Oshino et al. ............ 382/298 |
| 2004/0150659 A1 * | 8/2004 | Nakano et al. ........... 345/629 |
| 2004/0228522 A1 * | 11/2004 | Nakajima et al. ......... 382/162 |
| 2006/0215927 A1 * | 9/2006 | Okada et al. ............. 382/261 |
| 2006/0282855 A1 * | 12/2006 | Margulis ................. 725/43 |
| 2007/0103570 A1 * | 5/2007 | Inada et al. .............. 348/252 |
| 2008/0180385 A1 * | 7/2008 | Yoshida et al. ........... 345/102 |
| 2009/0219416 A1 * | 9/2009 | Tsuruoka ................. 348/241 |

FOREIGN PATENT DOCUMENTS

| JP | 2001-243463 A | 9/2001 |
| JP | 2003-263637 | 9/2003 |
| JP | 2005-130912 A | 5/2005 |
| JP | 2008-263586 | 10/2008 |

OTHER PUBLICATIONS

The above references were cited in a Feb. 7, 2012 Japanese Office Action, that issued in Japanese Patent Application No. 2011-028816.

* cited by examiner

*Primary Examiner* — Victor Kostak
(74) *Attorney, Agent, or Firm* — Cowan, Liebowitz & Latman, P.C.

(57) ABSTRACT

An image processing apparatus comprises: an acquisition unit that divides an inputted video image into a plurality of divisions, and acquires a histogram of each of the divisions; a generation unit that generates a gradation conversion curve for each of the divisions; a determination unit that determines whether or not the inputted video image is a multi-screen video image; and a gradation correction unit that performs a smoothing process in accordance with a pixel position, to correct the gradation of the video image in each of the divisions using the gradation conversion curve of each of the divisions, wherein when the inputted video image is the multi-screen video image, the determination unit detects a position of a boundary between the plurality of video image contents, and the gradation correction unit does not perform the smoothing process within a predefined area from the boundary.

12 Claims, 12 Drawing Sheets

FIG. 5

| -1 | -1 | -1 | -1 | -1 |
|----|----|----|----|----|
| -1 | -1 | 40 | -1 | -1 |
| -1 | -1 | -1 | -1 | -1 |

PSEUDO-CONTOUR

NO PSEUDO-CONTOUR

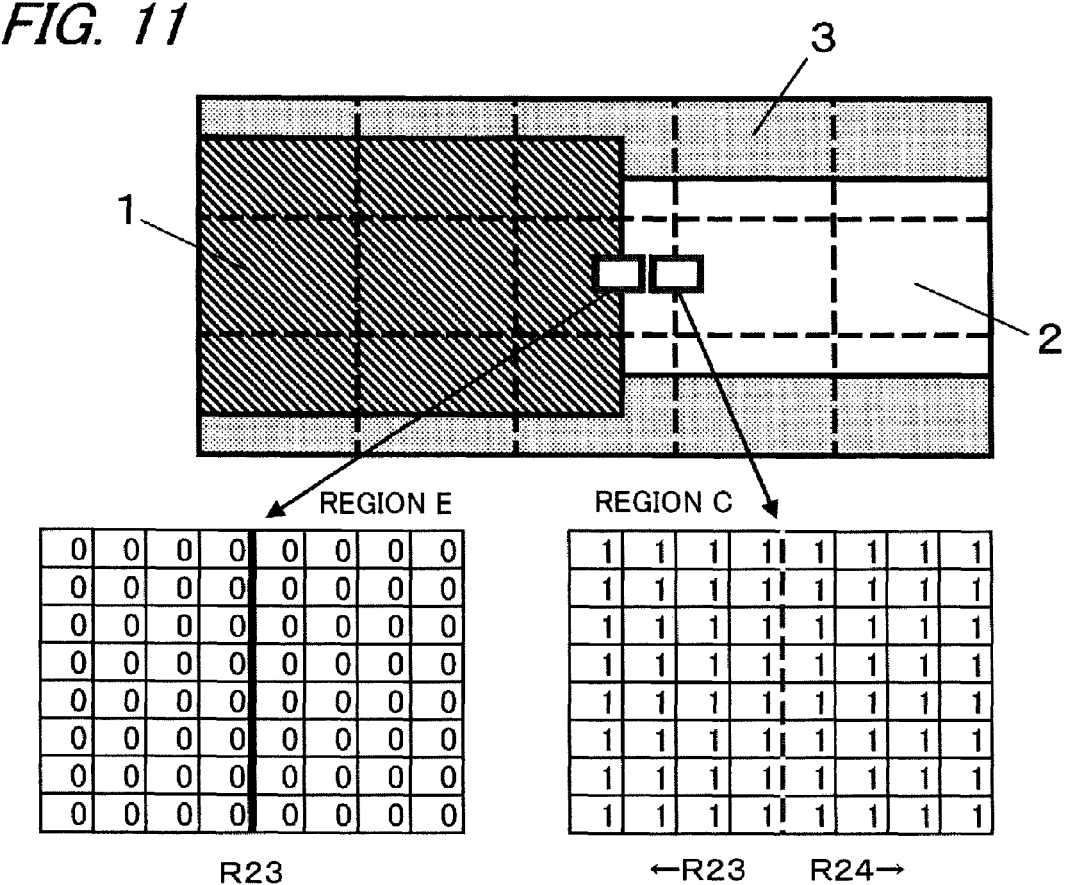

IMAGE PROCESSING APPARATUS AND CONTROL METHOD THEREOF FOR CORRECTING IMAGE SIGNAL GRADATION USING A GRADATION CORRECTION CURVE

BACKGROUND OF THE INVENTION

1. Field of the Invention

The present invention relates to an image processing apparatus and a control method thereof.

2. Description of the Related Art

In conventional technologies, the brightness in a partial region of a video image is smoothed in accordance with the distribution of brightness (brightness distribution) within that region, to preserve thereby sufficient contrast in regions having a large brightness distribution, and suppress noise emphasis in regions having a small brightness distribution (flat region) (Japanese Patent Application Publication No. 2003-263637).

Moreover, a technique is employed whereby changes in γ-curve between regions is smoothed (Japanese Patent Application Publication No. 2008-263586) in technologies where a video image is divided into a plurality of regions (divisions), and gradation is adjusted for each region using a gradation conversion curve (γ-curve) according to the image, to enhance thereby the contrast ratio of the image.

SUMMARY OF THE INVENTION

In the above-described conventional technologies, however, smoothing of changes γ-curve between divisions is performed also at boundary portions between video image contents, during multi-screen display, in which a plurality of video image contents is displayed on one screen. As a result, the image quality may become impaired at the boundary portions. In a case where, for instance, bright video image contents and dark video image contents are adjacent to each other, smoothing changes in γ-curve at a boundary portion between video image contents may give rise to interferences in the form of pseudo-contours and brightness jumps in the vicinity of the boundary.

The present invention provides a technique that allows suppressing image quality impairment at a boundary portion between video image contents during multi-screen display, in a gradation conversion process that employs a plurality of gradation conversion curves obtained for each division.

A first aspect of the present invention is an image processing apparatus that corrects gradation of a video image using a gradation conversion curve, comprising:

an acquisition unit that divides an inputted video image into a plurality of divisions, and acquires a histogram of each of the divisions;

a generation unit that generates a gradation conversion curve for each of the divisions, on the basis of the histogram of each of the divisions;

a determination unit that determines whether or not the inputted video image is a multi-screen video image in which a plurality of video image contents is displayed on one screen; and a gradation correction unit that performs a smoothing process that employs gradation conversion curves of the plurality of divisions in accordance with a pixel position, to correct the gradation of the video image in each of the divisions using the gradation conversion curve of each of the divisions, wherein when the inputted video image is the multi-screen video image, the determination unit detects a position of a boundary between the plurality of video image contents, and the gradation correction unit does not perform the smoothing process within a predefined area from the boundary.

A second aspect of the present invention is a control method of an image processing apparatus that corrects gradation of a video image using a gradation conversion curve, the method comprising:

an acquisition step for dividing an inputted video image into a plurality of divisions, and acquiring a histogram of each of the divisions;

a generation step for generating a gradation conversion curve for each of the divisions, on the basis of the histogram of each of the divisions;

a determination step for determining whether or not the inputted video image is a multi-screen video image in which a plurality of video image contents is displayed on one screen; and a gradation correction step for performing a smoothing process that employs gradation conversion curves of the plurality of divisions in accordance with a pixel position, to correct the gradation of the video image in each of the divisions using the gradation conversion curve of each of the divisions, wherein when the inputted video image is the multi-screen video image, a position of a boundary between the plurality of video image contents is detected in the determination step, and the smoothing process is not performed within a predefined area from the boundary, in the gradation correction step.

The present invention allows suppressing image quality impairment at a boundary portion between video image contents during multi-screen display, in a gradation conversion process that employs a plurality of gradation conversion curves obtained for each division.

Further features of the present invention will become apparent from the following description of exemplary embodiments with reference to the attached drawings.

BRIEF DESCRIPTION OF THE DRAWINGS

FIG. 5 is a diagram illustrating an example of a detection result of a gradation of interest;

FIG. 11 is a diagram illustrating an example of determination results by the correction determination unit according to Embodiment 2;

DESCRIPTION OF THE EMBODIMENTS

Embodiment 1

An explanation follows next on an image processing apparatus, and a control method thereof, according to Embodiment 1. The image processing apparatus according to the present embodiment corrects the gradation of a video image using a gradation conversion curve (γ-curve).

Figure 1:
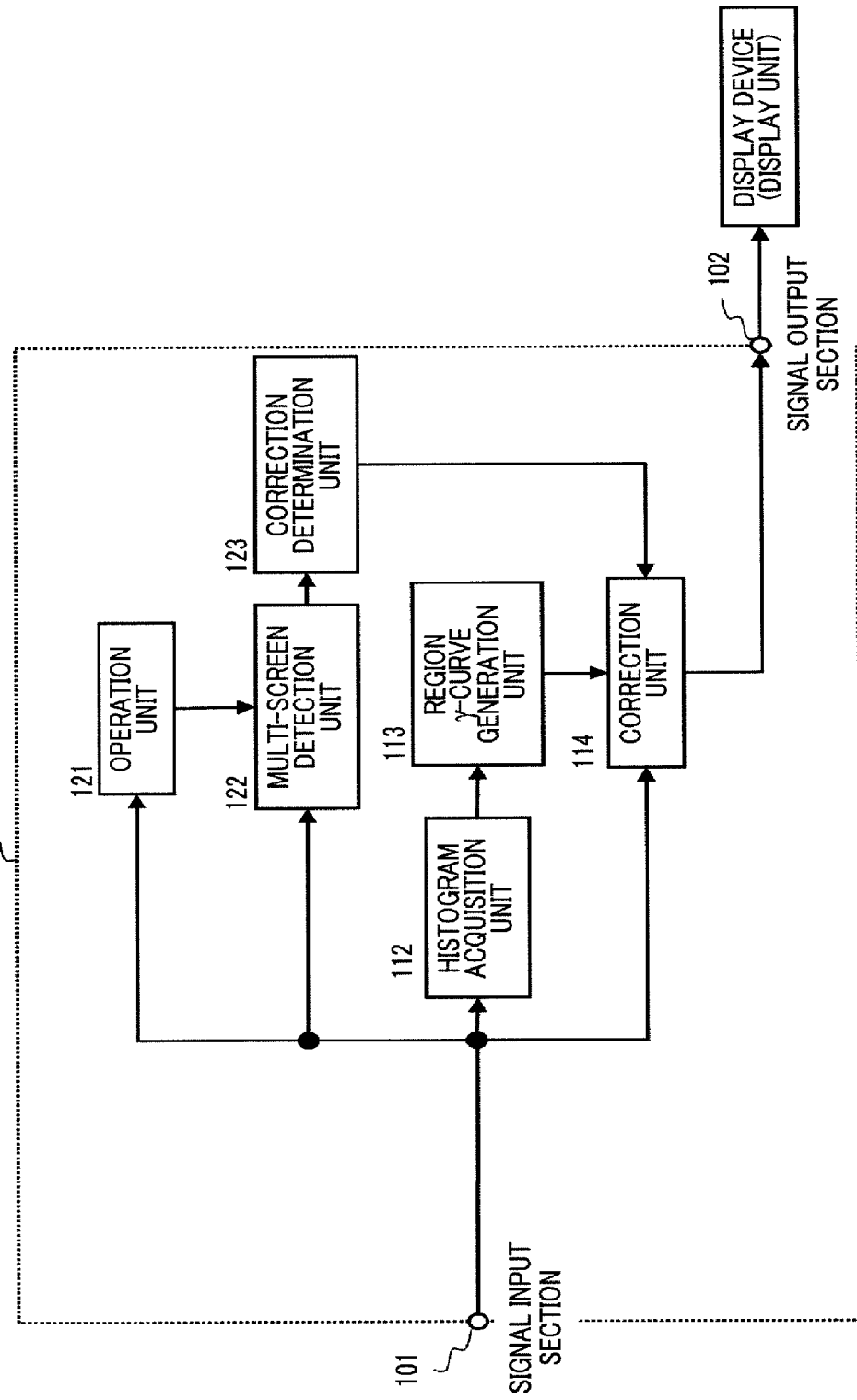
FIG. 1 is a block diagram illustrating the functional configuration of an image processing apparatus according to Embodiment 1.

FIG. 1 is a block diagram illustrating the functional configuration of an image processing apparatus according to the present embodiment. As illustrated in FIG. 1, an image processing apparatus 100 has, for instance, a signal input section 101, a histogram acquisition unit 112, a region γ-curve generation unit 113, a correction unit 114, an operation unit 121, a multi-screen detection unit 122, a correction determination unit 123 and a signal output section 102.

A video image (video image signal) and a control signal for controlling the image processing apparatus 100 are inputted to the signal input section 101. The video image signal is, for instance, a signal of a moving image, static image, text, CG or the like. Specifically, the video image signal includes for instance broadcast programs, electronic program data, data broadcast data, web data acquired via the Internet, and data inputted from an external device such as a digital camera, a camcorder, a recorder or the like.

The histogram acquisition unit 112 divides the video image inputted to the signal input section 101 into a plurality of divisions, and acquires a histogram of each division (an acquisition unit).

In the present embodiment, the histogram acquisition unit 112 divides an inputted 1920×1080 pixel video image into 5×3 divisions (divisions R11 to R35 in FIG. 3), and acquires a brightness histogram of each division. In the present embodiment there are 256 categories in the brightness histogram, with gradation values ranging from 0 to 255. The present embodiment is not limited to acquisition of a brightness histogram. For instance, an RGB histogram may be acquired instead.

The number of divisions is arbitrary. For instance, the video image may be divided into 15×10 or 20×10 divisions. The number of categories in the brightness histogram is not limited to 256. The brightness histogram may have 128 categories, with gradation values ranging from for 0 to 127, or 512 categories, with gradation values ranging from 0 to 511.

The region γ-curve generation unit 113 generates a γ-curve for each division on the basis of the histogram of each division (a generation unit). In the present embodiment, a gradation of interest is detected for each division, on the basis of the brightness histogram of that division. An optimal γ-curve is generated thereupon on the basis of the detection result. The gradation of interest is a gradation value for which increasing gradation of an image is desirable, and is, for instance, a gradation value whose frequency in the brightness histogram is equal to or greater than predefined frequency, or a gradation value that exhibits a peak in the brightness histogram.

The gradation of interest may be detected as one gradation of interest, or as a plurality of gradations of interest, for one division. For instance, the region γ-curve generation unit 113 may detect one gradation of interest, and generate a γ-curve in accordance with the detected gradation of interest. Also, one gradation of interest may be detected for each gradation range, for instance dark portions, bright portions, intermediate portions or the like. Further, a γ-curve may be generated according to the detected gradation of interest, for each gradation range, such that the γ-curves are joined to establish thereby a final γ-curve. Alternatively, the γ-curve of an intermediate portion may be decided through interpolation of the γ-curve of a dark portion and the γ-curve of a bright portion. The gradation ranges of dark portions, bright portions and intermediate portions may be set arbitrarily. For instance, a gradation value range from 0 to 85 may be set for dark portions, a gradation value range from 86 to 169 may be set for intermediate portions, and a gradation value range from 170 to 255 may be set for bright portions.

Figure 5:
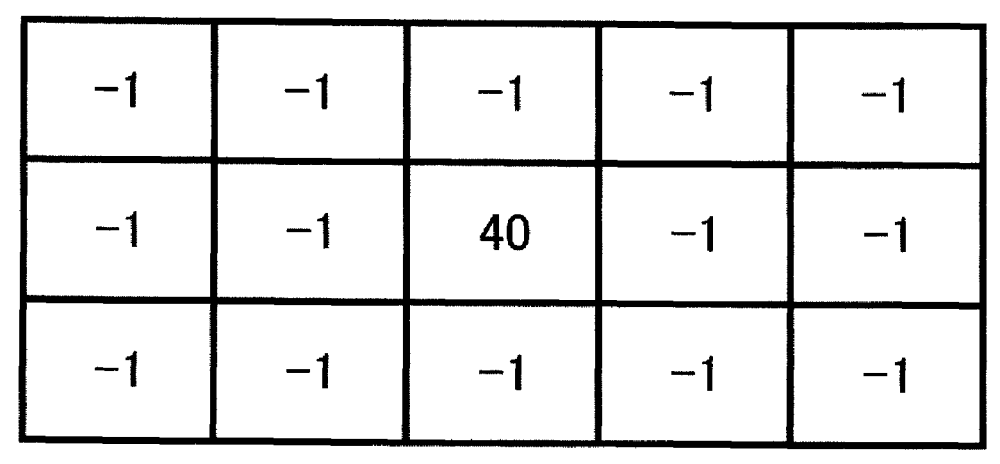

FIG. 5 is a diagram illustrating an example of a detection result of a gradation of interest. Specifically, FIG. 5 illustrates a detection result of a gradation of interest in a case where the video image illustrated in FIG. 4 is inputted (a case where there is inputted a video image in which video image content is present only at division R23).

In the present embodiment, a value (gradation value) of 0 to 255 as the detected gradation of interest (detection result) is set for each division. In the present embodiment, −1 is set for divisions at which no gradation of interest has been detected.

Figures 3, 4:
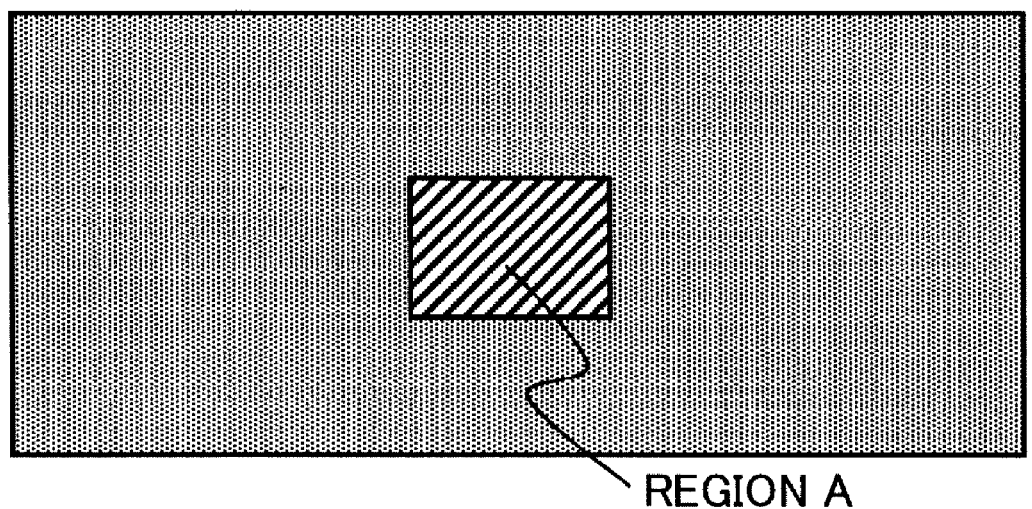
FIG. 3 is a diagram illustrating an example of a division.
FIG. 4 is a diagram illustrating an example of an input video image.

For instance, 40 is set as the value for division R23, as illustrated in FIG. 5, in a case where a gradation value 40 is detected as the gradation of interest at region A (division R23) in FIG. 4.

In FIG. 4 there is no video image content at regions other than region A (divisions R11 to R15, R21, R22, R24, R25, R31 to R35). Therefore, −1 is set for these regions, since no gradation of interest is detected therein.

Figure 6:
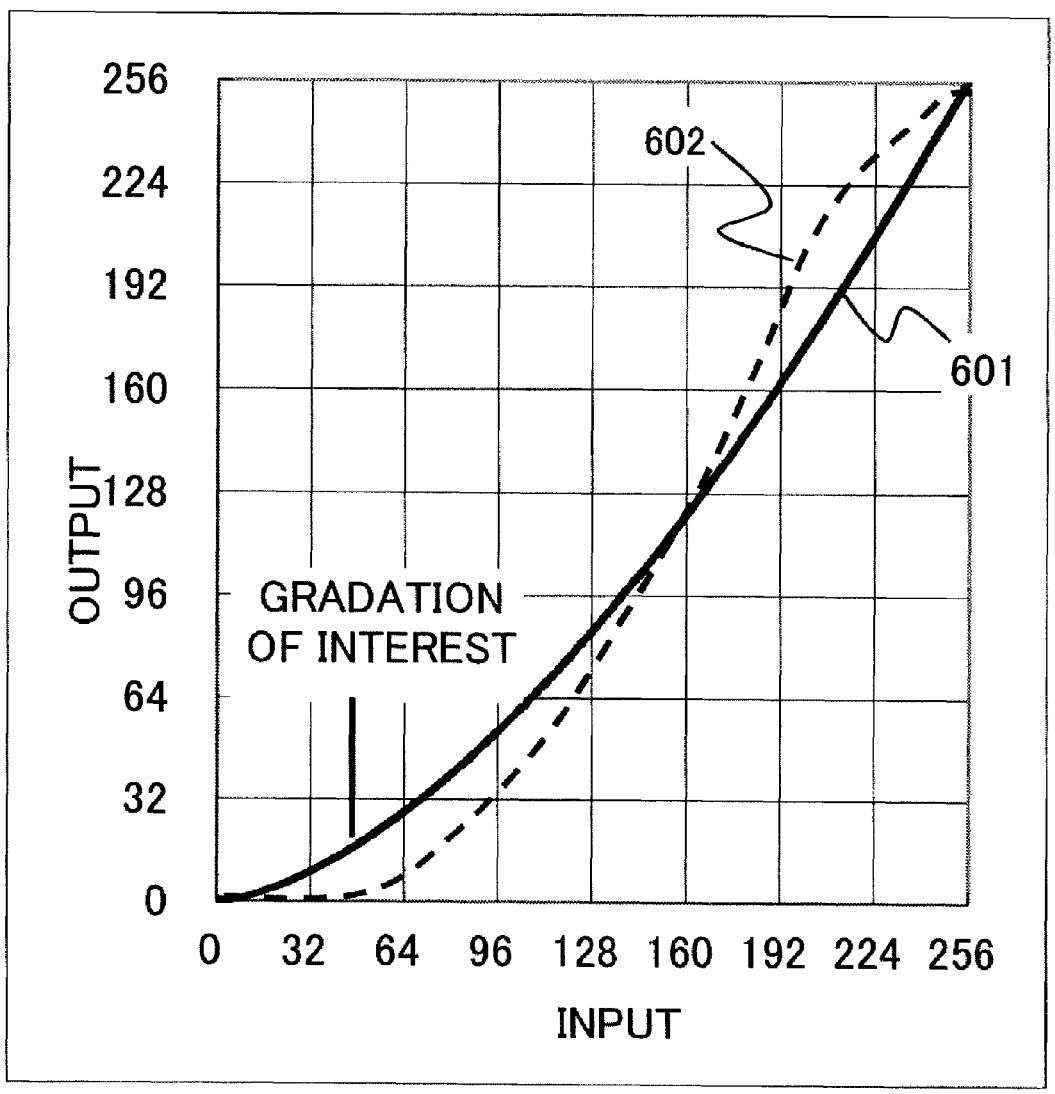
FIG. 6 diagram illustrating an example of a γ-curve.

FIG. 6 illustrates an example of a γ-curve generated on the basis of the detection result of the gradation of interest illustrated in FIG. 5. The value (detection result) of division R23 is 40, and hence there is generated a γ-curve 601 such that a video image near the gradation value 40, which is the gradation of interest, is not leveled out.

The value of the divisions R11 to R15, R21, R22, R24, R25, R31 to R35 is −1 (there is no gradation of interest). As a result, there is generated, for instance, a γ-curve 602 such that contrast is increased.

When the user operates a button provided in a remote control or in the main body of the image processing apparatus 100, the operation unit 121 generates a signal (operation signal) denoting the particulars of the operation, and outputs the signal, The multi-screen detection unit 122 determines whether the inputted video image is a multi-screen video image in which a plurality of video image contents is displayed on one screen (a determination unit). Specifically, there is determined whether the display mode is a one-screen display mode or a multi-screen display mode, on the basis of an operation signal from the operation unit 121 or a control signal and/or video image signal from the signal input section 101.

Herein, one-screen display mode denotes a display mode in which one video image content is displayed on the entirety of the screen.

A multi-screen display mode is a display mode in which a plurality of video image contents is displayed simultaneously on one screen (display mode in which multi-screen video images are displayed). In the multi-screen display mode, for instance, a plurality of video image contents having dissimilar video image sources is displayed simultaneously on one screen. The multi-screen display mode includes instances where data such as electronic program data, data broadcast data or the like are displayed simultaneously with other video image content, and instances where video image content is displayed together with a background, as in letterboxing. In the present embodiment, thus, video image contents encompass data, for instance, electronic program data, data broadcast data, as well as backgrounds. The multi-screen display mode includes also instances where images of a plurality of frames are displayed simultaneously on one video image content; instances where a plurality of video image contents having dissimilar capture positions (plurality of video image contents that make up a multi-angle video image or a 3D stereoscopic video image) are displayed simultaneously If the user presses for instance a "two-screen button" in a remote control, the display mode is switched to a two-screen display mode in which two video image contents are displayed on one screen. The display mode is switched to one-screen display mode if the user presses the "two-screen button" once more. Accordingly, the multi-screen detection unit 122 can determine the display mode on the basis of an operation signal generated when the "two-screen button" is pressed.

The display mode may be switched automatically to the multi-screen display mode, in some instances, if there is inputted a video image having added thereto a control signal, for instance as in video images comprising data broadcast data, or multiangle video images, 3D stereoscopic video images or the like. In such cases, the multi-screen detection unit 122 can determine the display mode on the basis of the presence or absence of such a control signal.

In a case where the inputted video image is a multi-screen video image, the multi-screen detection unit 122 detects the position of the boundaries between a plurality of video image contents, and stores information on the position of the boundaries (boundary information). The boundary information is, for instance, information for each division, or for each pixel, denoting whether a boundary is contained therein or not (denoting whether the division or the pixel is adjacent to the boundary).

The correction determination unit 123 determines whether or not to perform a smoothing process using a γ-curve of the plurality of divisions. Specifically, the above-described determination is performed on the basis of boundary information stored by the multi-screen detection unit 122. A smoothing process using a γ-curve of a plurality of divisions (hereafter, simply "smoothing process") is a process wherein the gradation of a pixel to be corrected is corrected using a γ-curve of a plurality of divisions around the pixel, in order to smoothen the change of a pixel value (brightness value, RGB value) between divisions (or to smoothen changes in the γ-curve).

The correction determination unit 123 outputs 0, as the determination result, for a position within a predefined area from the boundary between video image contents. In the present embodiment, the correction determination unit 123 performs a determination for each division, and outputs, as determination results, 0 for a division that includes a boundary between video image contents, and 1 for a division that does not include a boundary between video image contents.

FIGS. 7A, 7B, 8A and 8B are diagrams illustrating examples of determination results by the correction determination unit 123.

Figure 7A:
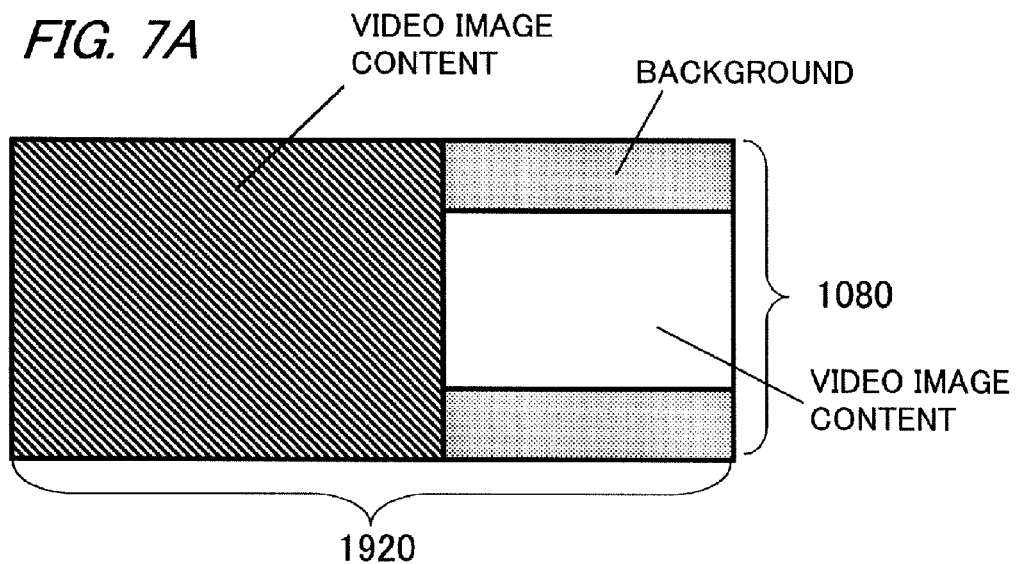
FIG. 7A is a diagram illustrating an example of two-screen display.
Figure 7B:
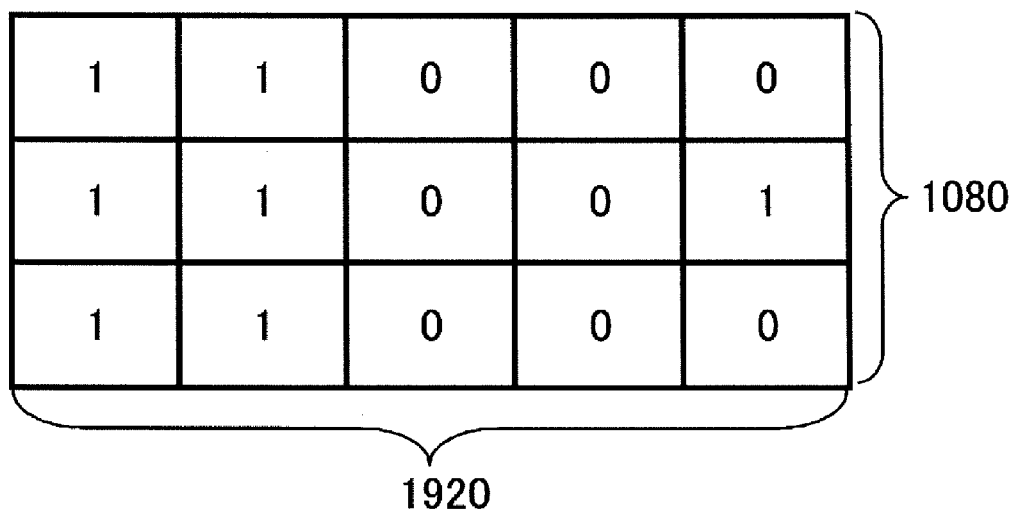
FIG. 7B is a diagram illustrating an example of a determination result by a correction determination unit according to Embodiment 1, in the case of two-screen display illustrated in FIG. 7A.

FIG. 7B is a determination result in a case where two-screen display, such as the one illustrated in FIG. 7A, is carried out. Divisions R13 to R15, R23, R24, R33 to R35 include a boundary between video image contents. Therefore, the determination result for these divisions is 0. Divisions R11, R12, R21, R22, R25, R31, R32 do not include a boundary between video image contents. Therefore, the determination result for these divisions is 1.

Figure 8A:
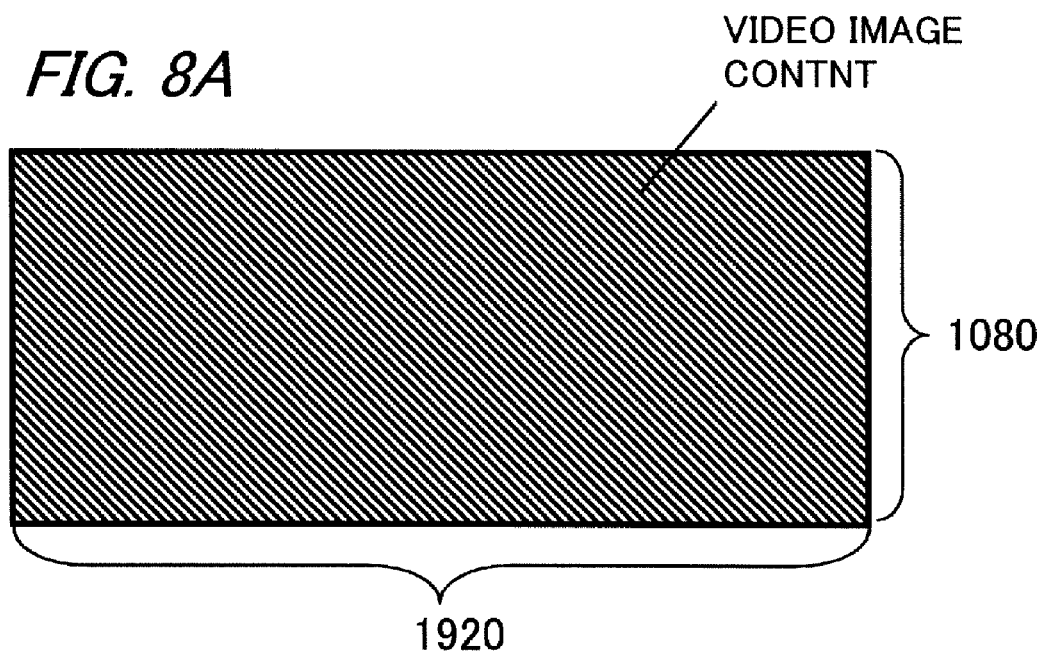
FIG. 8A is a diagram illustrating an example of one-screen display.
Figure 8B:
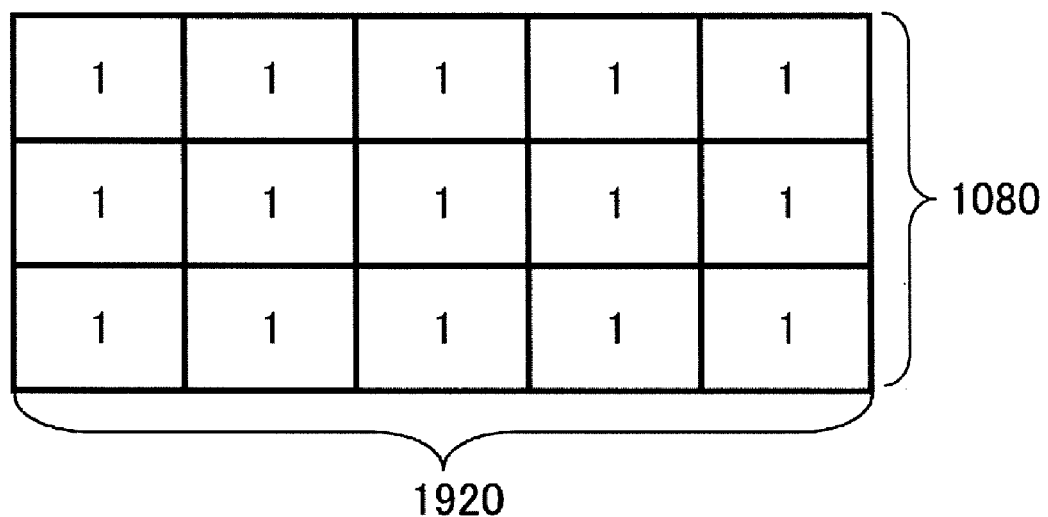
FIG. 8B is a diagram illustrating an example of a determination result by a correction determination unit according to Embodiment 1, in the case of one-screen display illustrated in FIG. 8A.

FIG. 8B is a determination result in a case where one-screen display, such as the one illustrated in FIG. 8A, is carried out. In this case, the determination result for all divisions is 1.

The correction unit 114 performs a smoothing process, in accordance with the pixel position, upon correction of the gradation of the video image in each division using the γ-curve of each division. In the present embodiment, the correction unit 114 performs the smoothing process on the basis of the γ-curve for each region as generated by the region γ-curve generation unit 113 and on the basis of the determination result by the correction determination unit 123. Specifically, there is corrected the gradation value (γ correction value) decided (converted) using the γ-curve of each division, in such a way so as smoothen the change of a pixel value (or the change in γ-curve) between divisions. For instance, a plurality of γ correction values is calculated using a plurality of γ-curves (γ-curve of each division), and the calculated plurality of γ correction values are combined with a weighting depending on the position of the respective pixels. The change of a pixel value (or the change in the γ-curve) between divisions is smoothed as a result. The signal output section 102 outputs a video image signal in which gradation values have been corrected, in the form of an output video image signal, to a display device (display unit) or the like. The image processing apparatus 100 and the display device may be integrated as a single whole (configuration wherein the display unit is built into the image processing apparatus 100).

In the present embodiment, the correction determination unit 123 and the correction unit 114 correspond to a gradation correction unit.

In the present embodiment there is corrected a γ correction value, but the γ-curve for each pixel may also be corrected.

The function of the correction unit 114 is explained in more detail below.

In the present embodiment no smoothing process is performed within a predefined area from the boundary between video image contents. Specifically, control is adaptively switched in such a manner that a smoothing process is performed for divisions at which the determination result by the correction determination unit 123 is 1, a smoothing process is not performed for divisions at which the determination result is 0.

Figure 9A:
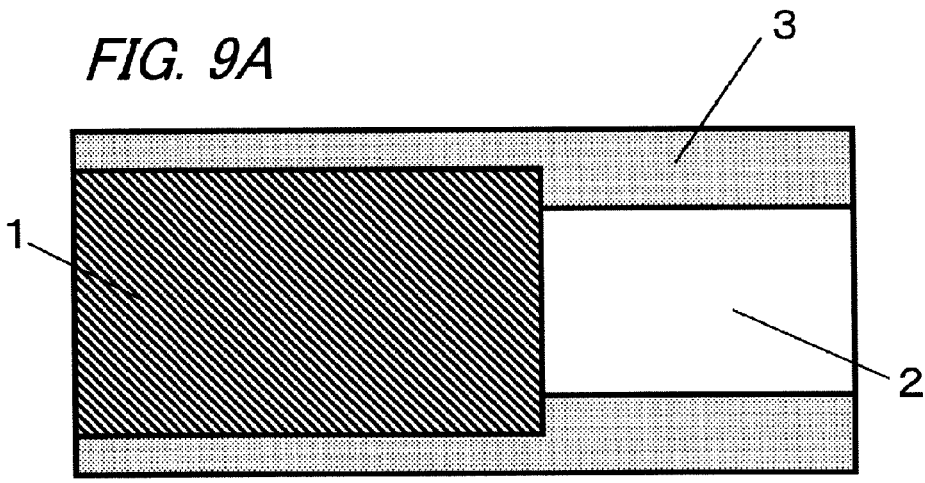
FIGS. 9A to 9C are image diagrams for explaining the effect of Embodiment 1.
Figure 9B:
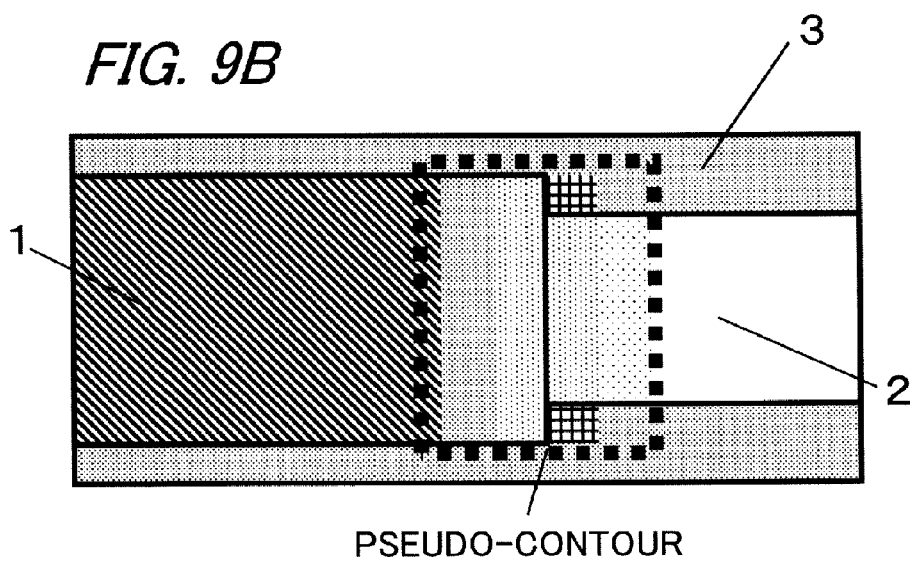
Figure 9C:
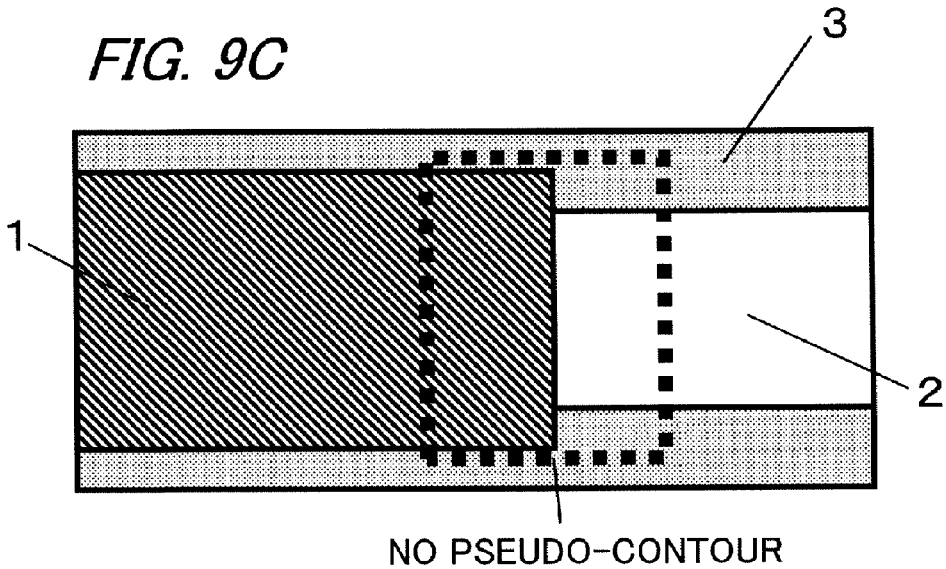

FIGS. 9A to 9C are image diagrams for explaining the effect of the present embodiment. FIG. 9A illustrates an input video image, FIG. 9B illustrates an output video image of a conventional image processing apparatus, and FIG. 9C illustrates an output video image of an image processing apparatus according to the present embodiment.

In the example of FIG. 9A, video image contents 1 and 2 are adjacent to each other. The video image content 1 is a low-brightness video image content, for instance a motion picture. The video image content 2 is a high-brightness video image content, for instance a studio recording.

Output video images obtained in accordance with a conventional technique will be explained first.

In a case where there is inputted a video image such as the one illustrated in FIG. 9A, the difference in brightness (for instance, APL value) between the video image content 1 and the video image content 2 is significant, and hence the γ-curve generated at a region of the video image content 1, and the γ-curve generated at a region of the video image content 2 may differ significantly from each other. In conventional techniques, the smoothing process is carried out for all divisions. Specifically, the smoothing process is carried out across the boundary between the video image content 1 and the video image content 2, and across the boundary between the video image contents 1, 2 and the background 3, as illustrated in FIG. 9B. In conventional techniques, as a result, there may occur interferences such as pseudo-contours and/or brightness jumps in the vicinity of the boundary between the video image content 1 and the video image content 2, and in the vicinity of the boundary between the video image contents 1, 2 and the background 3. The above-described brightness jumps and/or pseudo-contours move in response to gradual modifications in the size of the video image content 1 and the video image content 2, as a result of which the interference may become yet more conspicuous.

In the present embodiment, by contrast, no smoothing process is carried out in the vicinity of video image boundaries. As a result, this allows suppressing the occurrence of pseudo-contours and brightness jumps in the vicinity of the boundary between the video image content 1 and the video image content 2, and in the vicinity of the boundary between the video image contents 1, 2 and the background 3, as illustrated in FIG. 9C.

In a one-screen display mode, the smoothing process is carried out for all divisions. Therefore, it becomes possible to curb abrupt changes in γ-curve between divisions, and to reduce the unnatural interference feel caused by γ-curve differences.

As described above, image quality impairment at the boundary portion between video image contents during multi-screen display can be suppressed in a gradation conversion process that uses a plurality of gradation conversion curves determined for each division.

Specifically, the smoothing process is performed for the entire screen during one-screen display. This allows suppressing image quality impairment caused by γ-curve differences between divisions. During multi-screen display, control is carried out in such a manner that no smoothing process is performed within a predefined area from the boundary between video image contents, but the smoothing process is performed at regions other than the predefined area. This allows suppressing image quality impairment caused by performing the smoothing process between video image contents, and allows, at the same time, suppressing image quality impairment caused by γ-curve differences between divisions.

Embodiment 2

An explanation follows next on an image processing apparatus, and a control method thereof, according to Embodiment 2.

Figure 2:
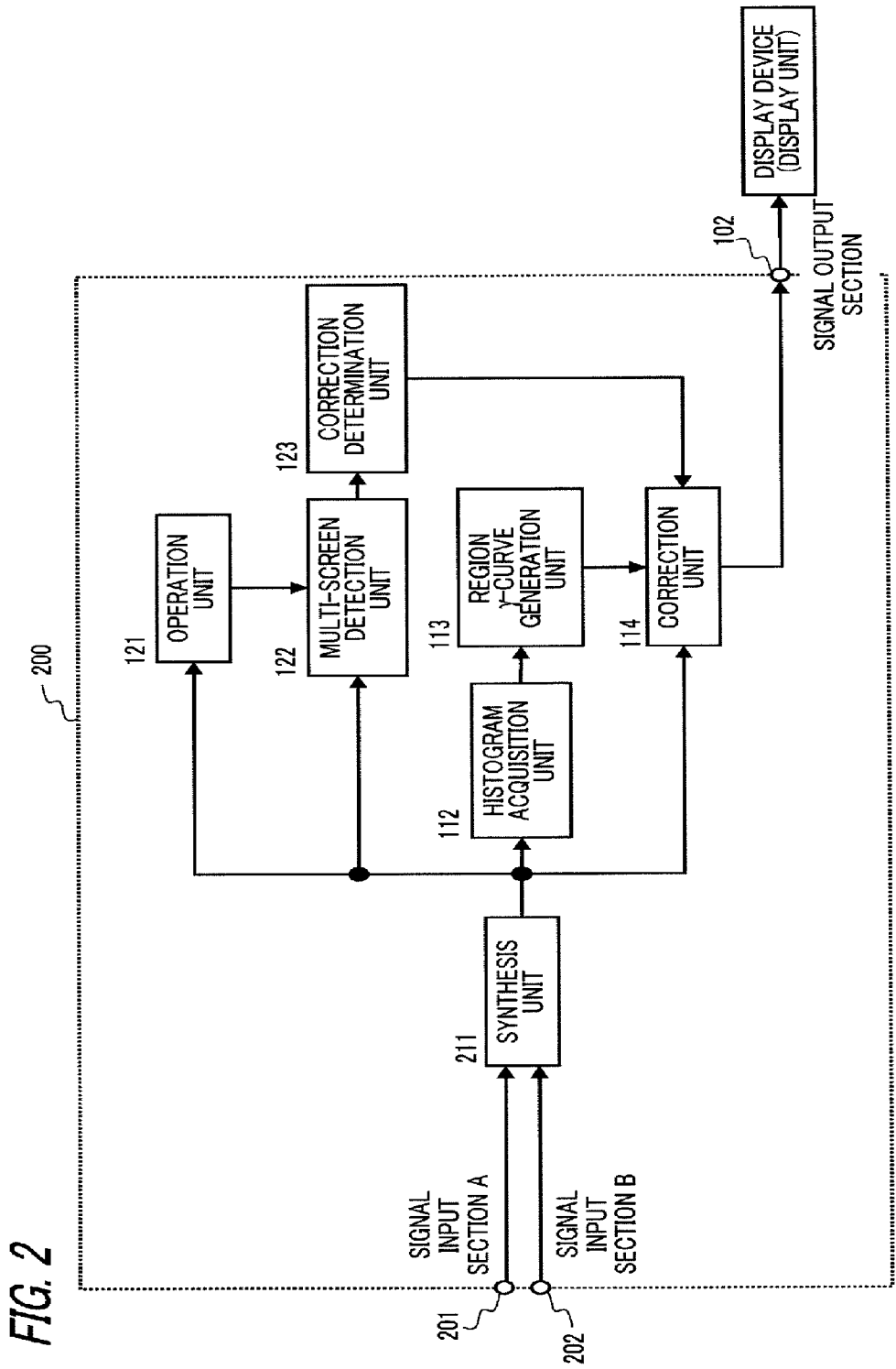
FIG. 2 is a block diagram illustrating the functional configuration of an image processing apparatus according to Embodiment 2.

FIG. 2 is a block diagram illustrating the functional configuration of an image processing apparatus according to the present embodiment. As illustrated in FIG. 2, an image processing apparatus 200 has, for instance, signal input sections A201, B202, a synthesis unit 211, a histogram acquisition unit 112, a region γ-curve generation unit 113, a correction unit 114, an operation unit 121, a multi-screen detection unit 122, a correction determination unit 123, and a signal output section 102. The image processing apparatus 200 and the display device may be integrated as a single whole (configuration wherein the display unit is built into the image processing apparatus 200). Functions identical to the functions of Embodiment 1 (functions illustrated in FIG. 1) will be denoted with the same reference numerals, and will not be explained again.

The synthesis unit 211 generates and outputs a multi-screen video image from a plurality of video image contents (a multi-screen video image generation unit). Specifically, the synthesis unit 211 synthesizes video image contents inputted through the signal input section A201 and the signal input section B202, to a layout that is in accordance with, for instance, a user operation or the type of inputted video images, and outputs the synthesized video image content.

The synthesis unit 211 outputs, to the multi-screen detection unit 122, layout information denoting the layout of the video image content in the generated multi-screen video image. On the basis of the layout information, the multi-screen detection unit 122 detects the position of the boundary between video image contents.

Specifically, the synthesis unit 211 outputs layout information for each frame. This allows acquiring accurate boundary information also when the layout is modified in frame units.

In the present embodiment, layout information refers to information denoting the layout of video image content in pixel units, namely the position of the boundary between video image contents detected in pixel unit by the multi-screen detection unit 211. The correction determination unit 123 determines whether or not a smoothing process is to be carried out, for each pixel. In the present embodiment, specifically, there is switched between performing and not performing a smoothing process in pixel units. As a result, this allows suppressing image quality impairment, caused by performing a smoothing process between video image contents, to a greater degree than in a case of switching between division units (i.e. the "predefined area" can be defined more rigorously).

Figure 10:
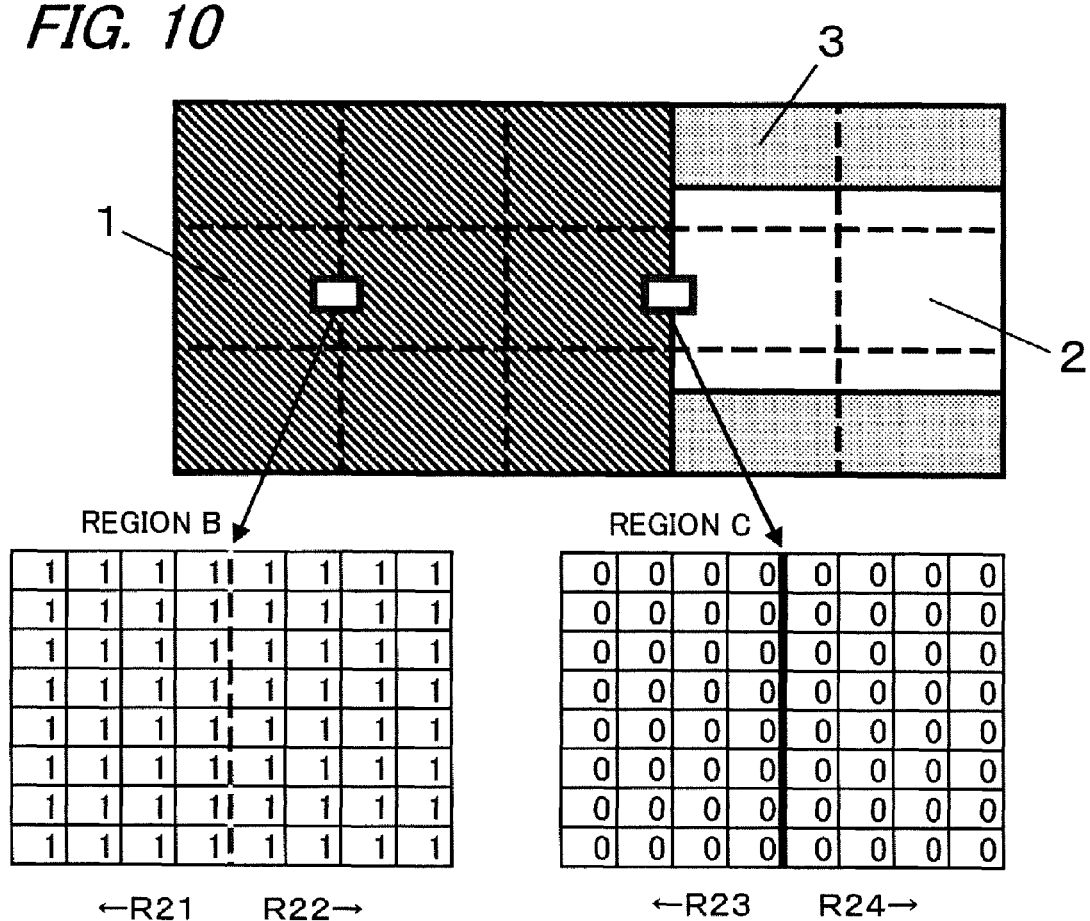
FIG. 10 is a diagram illustrating an example of determination results by a correction determination unit according to Embodiment 2.

FIGS. 10 and 11 are diagrams illustrating examples of determination results by the correction determination unit 123. Hereafter, video images will be divided in the same way as in Embodiment 1 (FIG. 3).

The correction determination unit 123 outputs, as a determination result, 0 for a pixel in the vicinity of a boundary between video image contents (within a distance from the boundary smaller than a predefined distance), and 1 for a pixel removed from the boundary between video image contents by a distance equal to or greater than a predefined distance.

The specific range from the boundary between video image contents, such that the determination result is 0 for pixels within that range, can be appropriately set in accordance with, for instance, the number of pixels of the display device, the resolution of the video image signal, and the number of divisions.

For instance, the determination result may be set to 0 for pixels in two divisions from the boundary between video image contents. Also, the determination criterion may be different in the vertical direction and the horizontal direction of the screen.

Region B illustrated in FIG. 10 (region of the boundary portion between divisions R21, R22) is not a region of a boundary portion between video image contents. Therefore, the determination result for the pixels in region B is 1 for all pixels.

By contrast, region C illustrated in FIG. 10 (region of the boundary portion between divisions R23, R24) is a region of a boundary portion between video image contents. Therefore, the determination result for the pixels in region C is 0 for all pixels.

FIG. 11 illustrates determination results by the correction determination unit 123 after modification of the display position and the size of the video image contents with respect to those in the two-screen display of FIG. 10.

Region C illustrated in FIG. 11 is no longer a region of a boundary portion between video image contents, as a result of the modification of the display position and the size of the video image contents. Therefore, the determination result for the pixels in region C is now 1 for all pixels.

By contrast, region E (partial region of division R23) illustrated in FIG. 11 becomes a region of a boundary portion between video image contents, as a result of the modification of the display position and the size of the video image content. Thus, the determination result for the pixels in region E is 0 for all pixels.

Figure 12A:
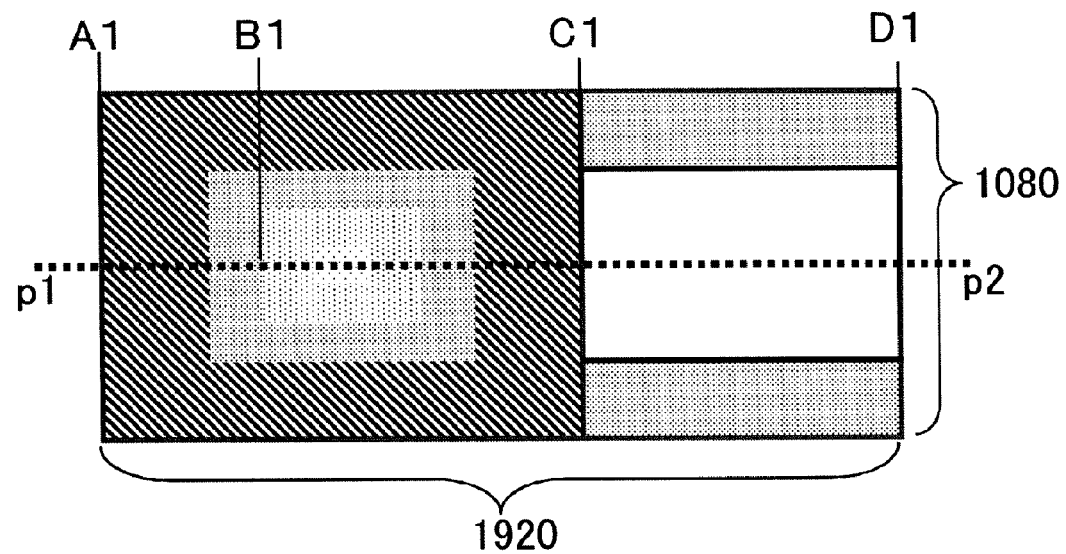
FIG. 12A is a diagram illustrating an example of an output video image by the image processing apparatus according to Embodiment 2.
Figure 12B:
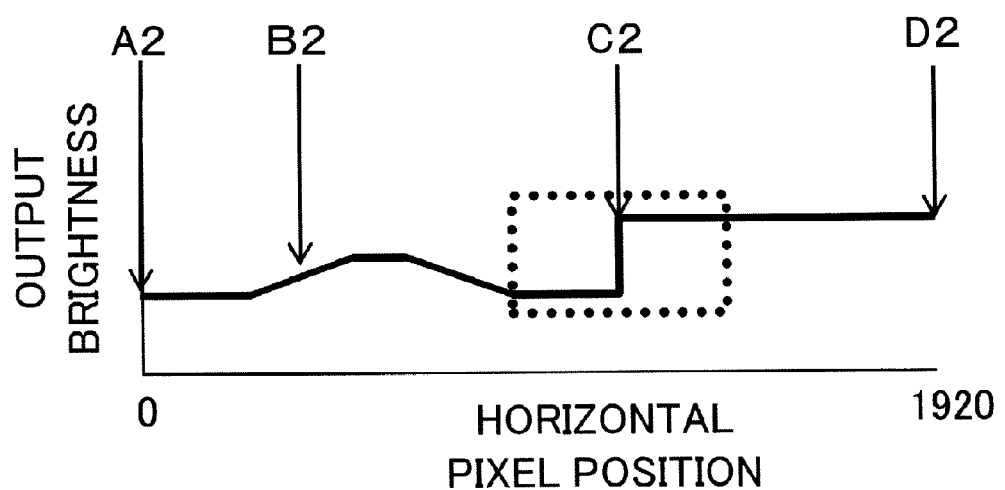
FIG. 12B illustrates brightness along the line indicated by a broken line p1-p2 in FIG. 12A.

FIGS. 12A and 12B are diagrams for explaining the effect of the present embodiment. FIG. 12A illustrates an output video image of an image processing apparatus according to the present embodiment, and FIG. 12B illustrates brightness along the line indicated by a broken line p1-p2 in FIG. 12A.

Arrow B2 in FIG. 12B denotes the brightness at position B1 in FIG. 12A, and arrow C2 in FIG. 12B denotes the brightness at position C1 in FIG. 12A. Similarly, arrows A2, D2 in FIG. 12B denote the brightness at positions A1, D1 in FIG. 12A.

The vicinity of position B1 of FIG. 12A is not a boundary portion between video image contents. Therefore, brightness in the vicinity of position B1 is smoothed gently, as illustrated in FIG. 12B.

In the vicinity of position C1 in FIG. 12A, brightness exhibits an abrupt change past the position C1, as illustrated in FIG. 12B. That is because no smoothing process is performed for pixels in the vicinity of position C1, since position C1 is a boundary portion between video image contents (i.e. since the determination result for pixels in the vicinity of position C1 is 0).

Figure 13A:
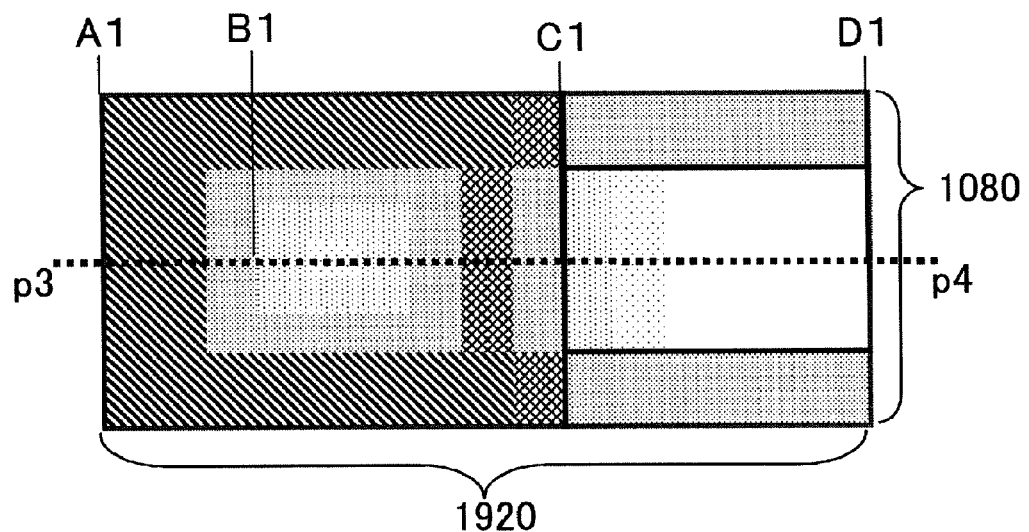
FIG. 13A illustrates an output video image of a conventional image processing apparatus.
Figure 13B:
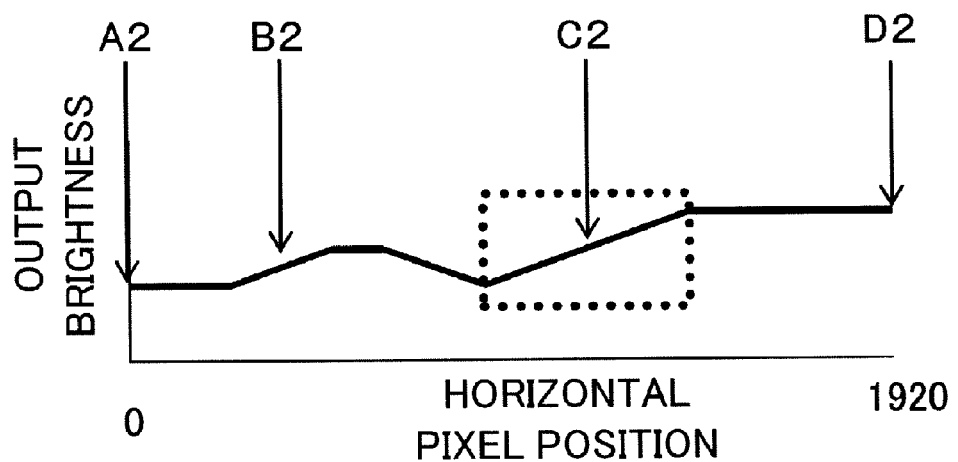
FIG. 13B illustrates brightness along the line indicated by a broken line p3-p4 in FIG. 13A.

FIG. 13A illustrates an output video image of a conventional image processing apparatus, and FIG. 13B illustrates brightness along the line indicated by a broken line p3-p4 in FIG. 13A.

In conventional techniques, the brightness in the vicinity of position C1 is smoothed, in the same way as in the brightness in the vicinity of position B1, as illustrated in FIG. 13B, despite the fact that position C1 in FIG. 13A is a boundary portion between video image contents. As a result, interference in the form of brightness jumps and/or pseudo-contours may occur in the vicinity of the boundary between video image contents, or in the vicinity of the boundary between video image contents and the background.

As described above, the present embodiment allows acquiring layout information in frame units. In turn, this allows updating boundary information in frame units, and allows obtaining accurate boundary information even upon modification of the layout of video image contents in a multi-screen video image. As a result, switching between performing or not a smoothing process can be performed with greater precision, and image quality deterioration, caused by performing a smoothing process between video image contents, can be yet further suppressed.

In the present embodiment, specifically, there is switched between performing and not performing a smoothing process, in pixel units. As a result, this allows suppressing image quality impairment, caused by performing a smoothing process between video image contents, to a greater degree than in a case of switching between division units.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-104895, filed on Apr. 30, 2010, and Japanese Patent Application No. 2011-028816, filed on Feb. 14, 2011, which are hereby incorporated by reference herein in their entirety.

What is claimed is:

1. An image processing apparatus that corrects gradation of a video image using a gradation conversion curve, comprising:
    an acquisition unit that divides an inputted video image into a plurality of divisions, and acquires a histogram of each of the divisions;
    a generation unit that generates a gradation conversion curve for each of the divisions, on the basis of the histogram of each of the divisions;
    a determination unit that determines whether or not the inputted video image is a multi-screen video image in which a plurality of video image contents are displayed on one screen; and
    a gradation correction unit that corrects the gradation of the video image in each of the divisions using the gradation conversion curve of each of the divisions,
    wherein in a case where the inputted video image is the multi-screen video image, the determination unit detects a position of a boundary between the plurality of video image contents, and
    the gradation correction unit performs the correction using only the gradation conversion curve of the division containing a pixel to be corrected in a case where the pixel to be corrected is within a predefined area from the boundary, and performs the correction using the gradation conversion curve of the division containing the pixel to be corrected and the gradation conversion curve of an adjacent division to the division containing the pixel to be corrected in a case where the pixel to be corrected is not within the predefined area from the boundary.

2. The image processing apparatus according to claim 1, wherein the determination unit detects a position of the boundary in pixel units, and
    the gradation correction unit switches between the correction using only the gradation conversion curve of the division containing the pixel to be corrected and the correction using the gradation conversion curve of the division containing the pixel to be corrected and the gradation conversion curve of the adjacent division, in pixel units.

3. The image processing apparatus according to claim 1, further comprising:
    a multi-screen video image generation unit that generates the multi-screen video image from the plurality of video image contents and outputs the generated multi-screen video image,
    wherein the multi-screen video image generation unit outputs layout information denoting a layout of video image contents in the generated multi-screen video image, and
    the determination unit detects a position of the boundary on the basis of the layout information.

4. The image processing apparatus according to claim 3, wherein the multi-screen video image generation unit outputs the layout information for each frame.

5. The image processing apparatus according to claim 1, further comprising a display unit that displays a video image the gradation of which has been corrected by the gradation correction unit.

6. The image processing apparatus according to claim 1, wherein in the correction using the gradation conversion curve of the division containing the pixel to be corrected and the gradation conversion curve of the adjacent division, a corrected value of the pixel to be corrected is determined so as to be a value obtained by combining a value calculated using only the gradation conversion curve of the division containing the pixel to be corrected with a value calculated using only the gradation conversion curve of the adjacent division, with a weighting depending on a position of the pixel to be corrected.

7. A control method of an image processing apparatus that corrects gradation of a video image using a gradation conversion curve, the method comprising:

an acquisition step for dividing an inputted video image into a plurality of divisions, and acquiring a histogram of each of the divisions;

a generation step for generating a gradation conversion curve for each of the divisions, on the basis of the histogram of each of the divisions;

a determination step for determining whether or not the inputted video image is a multi-screen video image in which a plurality of video image contents are displayed on one screen; and a gradation correction step for correcting the gradation of the video image in each of the divisions using the gradation conversion curve of each of the divisions, wherein in a case where the inputted video image is the multi-screen video image, a position of a boundary between the plurality of video image contents is detected in the determination step, and, in the gradation correction step, the correction using only the gradation conversion curve of the division containing a pixel to be corrected is performed in a case where the pixel to be corrected is within a predefined area from the boundary, and the correction using the gradation conversion curve of the division containing the pixel to be corrected and the gradation conversion curve of an adjacent division to the division containing the pixel to be corrected in a case where the pixel to be corrected is not within the predefined area from the boundary.

8. The control method according to claim 7, wherein in the determination step, a position of the boundary is determined in pixel units, and in the gradation correction step, switching between the correction using only the gradation conversion curve of the division containing the pixel to be corrected and the correction using the gradation conversion curve of the division containing the pixel to be corrected and the gradation conversion curve of the adjacent division is performed in pixel units.

9. The control method according to claim 7, further comprising a step of a multi-screen video image generation step for generating the multi-screen video image from the plurality of video image contents and outputting the generated multi-screen video image, wherein the multi-screen video image generation step includes a step for outputting layout information denoting a layout of video image contents in the generated multi-screen video image, and in the determination step, a position of the boundary is detected on the basis of the layout information.

10. The control method according to claim 9, wherein in the multi-screen video image generation step, the layout information is outputted for each frame.

11. The control method according to claim 7, further comprising a step for displaying a video image the gradation of which has been corrected in the gradation correction step.

12. The control method according to claim 7, wherein in the correction using the gradation conversion curve of the division containing the pixel to be corrected and the gradation conversion curve of the adjacent division, a corrected value of the pixel to be corrected is determined so as to be a value obtained by combining a value calculated using only the gradation conversion curve of the division containing the pixel to be corrected with a value calculated using only the gradation conversion curve of the adjacent division, with a weighting depending on a position of the pixel to be corrected.

* * * * *